US006748440B1

(12) United States Patent
Lisitsa et al.

(10) Patent No.: US 6,748,440 B1
(45) Date of Patent: Jun. 8, 2004

(54) FLOW OF STREAMING DATA THROUGH MULTIPLE PROCESSING MODULES

(75) Inventors: Rafael S. Lisitsa, Bellevue, WA (US); George H. J. Shaw, Woodinville, WA (US); Dale A. Sather, Seattle, WA (US); Bryan A. Woodruff, North Bend, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/310,610

(22) Filed: May 12, 1999

(51) Int. Cl.[7] ............................................... G06F 15/16
(52) U.S. Cl. ..................... 709/231; 709/238; 709/246; 709/249
(58) Field of Search ................................ 709/231, 238, 709/246, 249

(56) References Cited

U.S. PATENT DOCUMENTS

| 5,551,037 A | * | 8/1996 | Fowler et al. |
| 5,737,623 A | * | 4/1998 | Liebrock |
| 5,825,430 A | * | 10/1998 | Adolph et al. |
| 6,086,628 A | * | 7/2000 | Dave et al. |
| 6,175,957 B1 | * | 1/2001 | Ju et al. |
| 6,311,221 B1 | * | 10/2001 | Raz et al. |

FOREIGN PATENT DOCUMENTS

| EP | 0 550 196 | 7/1993 |
| EP | 0 847 191 | 6/1998 |
| WO | WO 97 50242 | 12/1997 |

OTHER PUBLICATIONS

Connell, Edward V. et al.: "Combinative Interactions of a Human Immunodeficiency Virus (HIV) Tat Antagonist with HIV Reverse Transcriptase Inhibitors and an HIV Protease Inhibitor", Antimicrobial Agents and Chemotherapy, Feb. 1, 1994, pp. 348–352, XP 000654722.

Rubine, Dean et al.: "Low–Latency Interaction Through Choice–Points, Buffering, and Cuts in Tactus", Proceedings of the International Conference on Multimedia Computing and Systems, May 14–19, 1994, XP 000541903.

Horn, F.: "On Programming and Supporting Multimedia Object Synchronization", Computer Journal, Oxford University Press, vol. 36, No. 1, 1993, pp. 4–18, XP 000360261.

Ravindran, K. and Bansal, Vivek: "Delay Compensation Protocols for Synchronization of Multimedia Data Streams", IEEE Transactions on Knowledge and Data Engineering, vol. 5, No. 4, Aug. 4, 1993, pp. 574–589, XP 002162224.

* cited by examiner

Primary Examiner—Anil Khatri
Assistant Examiner—Thomas Pham
(74) Attorney, Agent, or Firm—Leydig, Voit & Mayer, Ltd.

(57) ABSTRACT

Frame-based streaming data flows through a graph of multiple interconnected processing modules. The modules have a set of performance parameters whose values specify the sensitivity of each module to the selection of certain resources of a system. A user specifies overall goals for an actual graph for processing a given type of data for a particular purpose. A flow manager constructs the graph as a sequence of module interconnections required for processing the data, in response to the parameter values of the individual modules in the graph in view of the goals for the overall graph as a whole, and divides it into pipes each having one or more modules and each assigned to a memory manager for handling data frames in the pipe.

24 Claims, 5 Drawing Sheets

FLOW OF STREAMING DATA THROUGH MULTIPLE PROCESSING MODULES

FIELD OF THE INVENTION

The Present invention relates to electronic data processing, and more specifically concerns managing the flow of streaming data through multiple hardware and/or software processing modules in a computer.

BACKGROUND OF THE INVENTION

Streaming data is a continuous flow of data that must be ultimately presented to a user in a particular sequence in real time. Digital samples representing an audio signal, for example, must be converted to a sound wave in the same sequence they were transmitted, and at exactly the time spacing they were generated, or some user-specified alternative. Digital data representing video frames require assembly into the proper sequence in the frame for presentation on a display together, and successive frames must display at the correct real-time rate.

Streaming data need not necessarily maintain correct sequence or timing throughout an entire communication chain among various transmitters, processors, memories, and receivers. Indeed, video and audio clips are frequently stored as static data in recording media, computer memories, and network buffers. Packet-switched systems might also carry parts of the same streaming data over different paths and even in different time sequences. Processors such as digital filters can assemble parts of the data stream, modify them as a static unit, then release them to further units in the system. Eventually, however, the stream must be heard or seen in the correct sequence at the proper relative times.

Streaming data almost always involves very large amounts of data. Streaming data almost always challenges the capacity of digital buses in computers to access it, carry it and switch it. Streaming data almost always taxes the processing power of functional units, both software and hardware, to receive it, convert it, and pass it on to other units. Those in the art speak of the necessity of "fat pipes" for streaming data.

Inefficiencies in reading and writing are especially deleterious in the handling of streaming data. These operations contribute nothing useful to processing the data. Yet the functional units that do perform useful work usually require movement of the data to and from a storage. Moreover, different kinds of streaming data usually require different kinds of processing by different hardware and/or software modules interconnected in different ways. No general-purpose computer, such as a personal computer, can afford to hard-wire all the necessary modules in a dedicated configuration for any one type of such data. This fact increases the need for intermediate storage, and thus for reading and writing operations.

An abstract model has been developed to represent the connections among various facilities in a computer that are required to process a given type of streaming data. For example, a video clip might require MPEG decoding in a dedicated chip, rasterizing the video fields in another hardware module, digital filtering of the audio in a software module, insertion of subtitles by another software module, D/A conversion of the video in a video adapter card, and D/A conversion of the audio in a separate audio card. A number of different types of memory in different locations can store the data between successive operations, and a number of buses can be made available to transport the data.

An architecture called WDM-CSA (Windows Driver Model Connection and Streaming Architecture) introduces the concept of a graph for specifying the connections among the facilities of a computer where a data stream must pass through a number of processing units in an efficient manner. The WDM-CSA protocol also simplifies the development of drivers for such data. Basically, WDM-CSA specifies the flow of data frames through a graph, and also the control protocols by which adjacent modules in the graph communicate with each other to request and accept the data frames. Heretofore, however, streaming graphs have been used improve the actual data flow only to the extent of reducing inter-buffer data transfers between adjacent functional units in the graph. Global improvement of the entire data flow over the graph has not been attempted. Accordingly, a need remains for further efficiencies in processing streaming and related kinds of data using a connection graph, by increasing the overall speed of data flowing through the graph, by reducing the systems resources usage, and/or by satisfying formal goals and constraints specified by the graph's client.

SUMMARY OF THE INVENTION

The present invention increases the speed and efficiency of frame-based streaming data flowing through a graph of multiple modules in a data processor or similar system. Rather than optimizing the performance of individual modules or of certain graph configurations, the invention improves the performance of the graph as a whole when constructing it from a sequence of modules.

In one aspect of the invention, the modules that can be used in a streaming-data graph have a set of performance parameters whose values specify the sensitivity of each module to the selection of certain resources, such as bus medium for carrying the data, memory type for storing it, and so forth. A user, such as an application program for presenting streaming data, can specify overall goals for an actual graph for processing a given type of data for a particular purpose. A flow manager constructs the graph as a sequence of module interconnections required for processing the data, in response to the parameter values of the individual modules in the graph in view of the goals for the overall graph as a whole.

Another aspect of the invention divides the overall streaming-data graph into a group of pipes containing one or more of the modules in the graph. This division further improves the graph operation by reducing the number of times that data must be copied or stored while progressing through the graph. Each pipe has a memory allocator that serves the frames of all modules in the pipe. The pipes can optionally be designed in response to the module performance parameters and the graph goals.

A further aspect of the invention provides a streaming-data graph including the interconnection specifications of modules in particular pipes, and of the pipes into the total graph.

DETAILED DESCRIPTION

The following detailed description of preferred embodiments refers to the accompanying drawings that form a part hereof, and shows by way of illustration specific embodiments of the present invention. These embodiments are described in sufficient detail to enable those skilled in the art to practice the invention. Structural, logical, and procedural modifications within the spirit and scope of the invention will occur to those in the art. The following description is therefore not to be taken in a limiting sense, and the scope of the inventions is defined only by the appended claims.

Operating Environment

Figure 1:
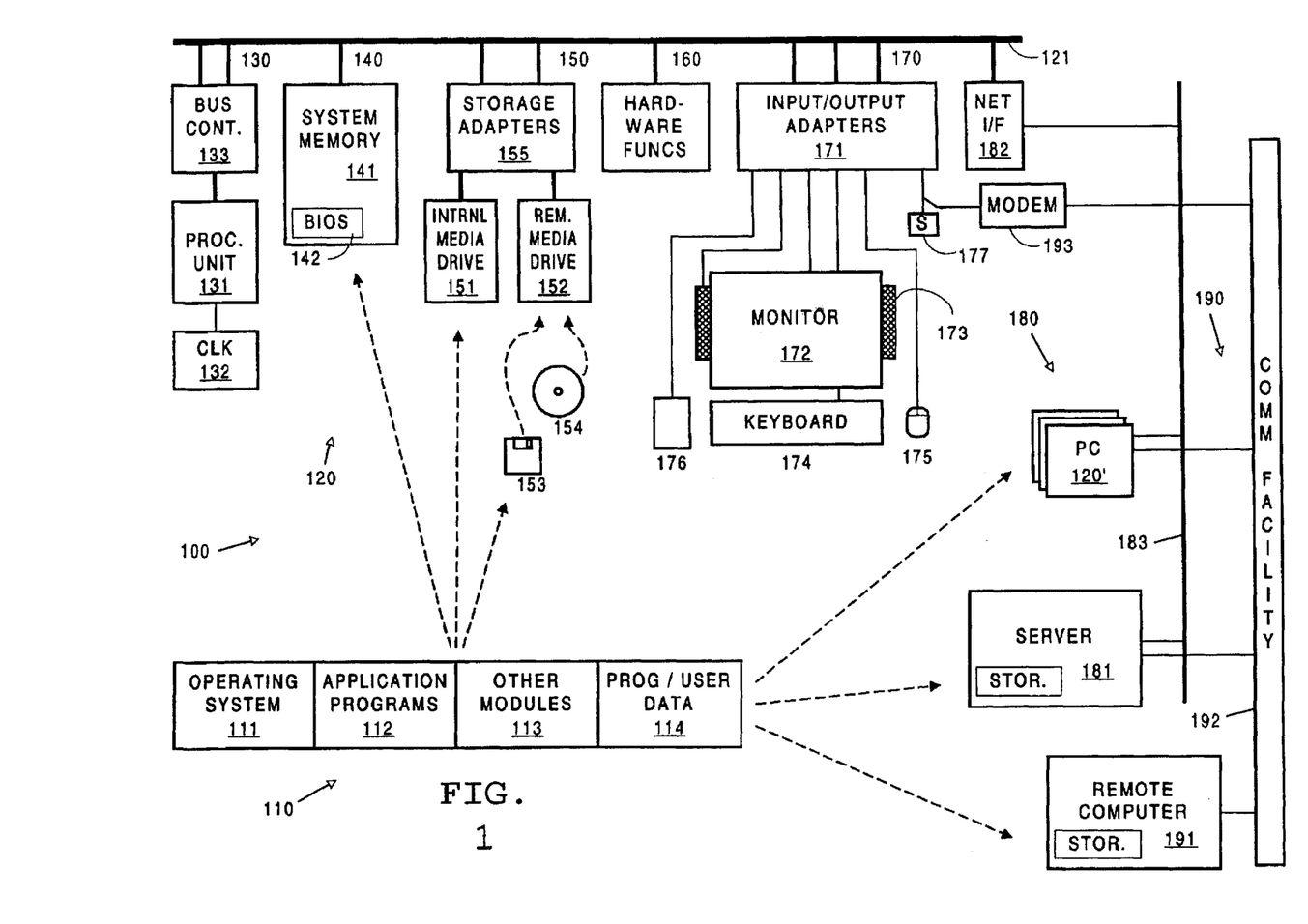
FIG. 1 is a block diagram of an illustrative environment for the present invention.

FIG. 1 is a high-level diagram of an illustrative environment 100 in which the invention is implemented as executable instructions, data, and/or hardware on a programmable general-purpose computer such as personal computer (PC) 120. Other suitable environments, and variations of the described environment, will occur to those skilled in the art.

A conventional PC 120 typically comprises a number of components coupled together by one or more system buses 121 for carrying instructions, data, and various control signals. These buses may assume a number of forms, such as the conventional ISA, PCI, and AGP buses. Some or all of the units coupled to a bus can act as a bus master for initiating transfers to other units.

Processing unit 130 may have one or more microprocessors 131 driven by system clock 132 and coupled to one or more buses 121 by controllers 133. Internal memory system 140 supplies instructions and data to processing unit 130. High-speed RAM 141 stores any or all of the elements of software 110. ROM 142 commonly stores basic input/output system (BIOS) software for starting PC 120 and for controlling low-level operations among its components. Bulk storage subsystem 150 stores one or more elements of software 110. Hard disk drive 151 stores software 110 in a nonvolatile form. Drives 152 read and write software on removable media such as magnetic diskette 153 and optical disc 154. Other technologies for bulk storage are also known in the art. Adapters 155 couple the storage devices to system buses 121, and sometimes to each other directly. Other hardware units and adapters, indicated generally at 160, may perform specialized functions such as data encryption, signal processing, and the like, under the control of the processor or another unit on the buses.

Input/output (I/O) subsystem 170 has a number of specialized adapters 171 for connecting PC 120 to external devices for interfacing with a user. A monitor 172 creates a visual display of graphic data in any of several known forms. Speakers 173 output audio data that may arrive at an adapter 171 as digital wave samples, musical-instrument digital interface (MIDI) streams, or other formats. Keyboard 174 accepts keystrokes from the user. A mouse or other pointing device 175 indicates where a user action is to occur. Block 176 represents other input and/or output devices, such as a small camera or microphone for converting video and audio input signals into digital data. Other input and output devices, such as printers and scanners commonly connect to standardized ports 177. These ports include parallel, serial, SCSI, USB, FireWire, and other conventional forms.

Personal computers frequently connect to other computers in networks. For example, local area network (LAN) 180 connect PC 120 to other PCs 120' and/or to remote servers 181 through a network adapter 182 in PC 120, using a standard protocol such as Ethernet or token-ring. Although FIG. 1 shows a physical cable 183 for interconnecting the LAN, wireless, optical, and other technologies are also available. Other networks, such as wide-area network (WAN) 190 can also interconnect PCs 120 and 120', and even servers 181, to remote computers 191. FIG. 1 illustrates a communications facility 192 such as a public switched telephone network for a WAN 190 such as the internet. PC 120 can employ an internal or external modem 193 coupled to serial port 177; however, other known technologies such as ISDN, asynchronous transfer mode (ATM), frame-relay, and others are becoming more widespread. In a networked or distributed-computing environment, some of the software 110 may be stored on the other peer PCs 120', or on computers 181 and 191, each of which has its own storage devices and media.

Software elements 110 may be divided into a number of types, whose designations overlap to some degree. For example, the previously mentioned BIOS sometimes includes high-level routines or programs which might also be classified as part of an operating system (OS) in other settings. The major purpose of OS 111 is to provide a software environment for executing application programs 112. An OS such as Windows® from Microsoft Corp. commonly implements high-level application-program interfaces (APIs), file systems, communications protocols, input/output data conversions, and other functions. It also maintains computer resources and oversees the execution of various programs. Application programs 112 perform more direct functions for the user. The user normally calls them explicitly, although they can execute implicitly in connection with other applications or by association with particular data files or types. Modules 113 are packages of executable instructions and data which may perform functions for OSs 111 or for applications 112. These might take the form of dynamic link libraries (.dll). Finally, data files 114 includes collections of non-executable data such as text documents, databases, and media such as graphics images and sound recordings. Again, the above categories of software 110 are neither exhaustive nor mutually exclusive.

Figures 2, 3:
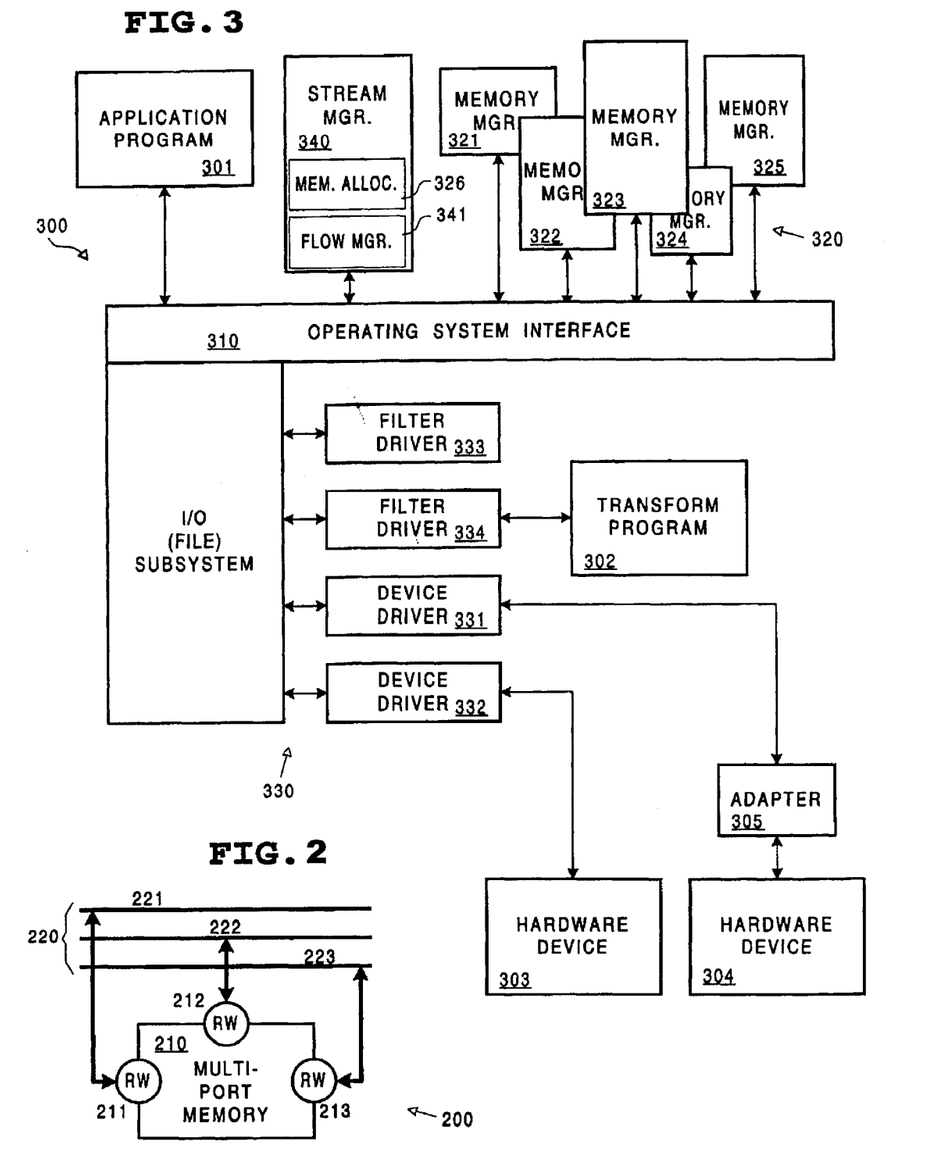
FIG. 2 details a multi-port memory of FIG. 1.
FIG. 3 details certain components of FIG. 1 relevant to the invention.

FIG. 2 is a block diagram of one type of conventional memory 200 that is often employed in processing high-speed data such as streaming data. Memory module 210 is a multiport memory 210 having three read/write ports 211–213, each of which can both receive data for storage in module 210 and retrieve data already stored there. More or fewer ports are possible, and some of the ports can be write-only or read-only. Operations at multiple ports can occur simultaneously, although the internal operation of module 210 might serialize and/or synchronize them. Memory 200 can form a part of PC memory system 140, FIG. 1, or might be built into any of the other blocks, such as functions 160 or adapters 170. Multiport memories frequently function to buffer large quantities of data for transfer from one bus to another in a system. FIG. 2 illustrates a group of buses 220, which can be included in the group of buses 121 in FIG. 1. Ports 211–213 couple to individual buses 221–223, respectively. This connection allows, for example, a PCI bus to deposit a data frame to memory module 210, and an AGP or dedicated video bus to retrieve the frame.

FIG. 3 shows the relevant components 300 that the present invention employs. For purposes of illustration only, some of the components described are found in the Windows-2000 operating system (OS) from Microsoft Corp.

Components 310–330 live in the kernel layer, although they can reside at other locations in the architecture of a particular OS.

Interface component 310 interfaces with other components at the kernel layer, with software such as programs 301 and 302 outside the OS, and with hardware devices such as devices 303–304 and hardware adapter 305. Application program 301 might be, for example, a viewer utility by which a user selects certain streaming data for presentation. A program or other module that requests or specifies a stream of data will be referred to as a client. Program 302 represents a software module for transforming data in some way, such as a software digital filter or compander. Device 303 could be a hardware module such as a memory or an MPEG-2 decoder. Device 304 might represent an off-line storage device such as a DVD player or a cable TV, with its hardware interface adapter 305.

Physical memories in system 100 have memory manager components 320 for organizing the data stored in them. For example, allocator 321 might specify a frame size, data type, offset, and other characteristics of the data stored in memory module 200, FIG. 2. A single physical memory module can have multiple managers for organizing different data at different times or in different parts of the module. A single manager can also serve multiple physical memories. The significant function of managers 320 in the present context is to allocate and deallocate blocks of memory for storing frames or other units of streaming data. For this reason, managers 320 will frequently be referred to as memory allocators herein. A frame is allocated whenever newly arriving data requests it, or it can be pre-allocated. The frame carries the data through one or more filters in a path, and is deallocated when all filters in the path have finished processing that data. Frames can be destroyed, but are usually recycled with further new data arriving in the path.

In Windows-2000, an I/O subsystem 330 supervises both file storage and other I/O devices and facilities. Requests for file or I/O services are routed from an application program or other source to hardware devices such as 303 and 304 via one or more layers of device drivers such as 331 and 332. Along the way, filter drivers such a s 333 and 334 may intercept the data, file handles, I/O request packets, and other information, based upon certain characteristics or events. Filter drivers can process data internally as shown at 333. They can also pass information back and forth to programs such as 302, which can be located within the OS kernel layer or at any other point in the software architecture of system 100. Components can be dedicated to a single function, or, more often, can be programmed to carry out multiple functions, either sequentially or concurrently. A digital signal processor, for example, can execute many different functions such as frequency filtering, gain changing, and acoustic effects.

Block 340 implements the WDM-CSA component that builds and manages graphs for streaming data, and includes a graph data-flow manager 341. Block 340 can also include one or more memory managers or allocators 326.

Streaming Data Flow

Figures 4, 5:
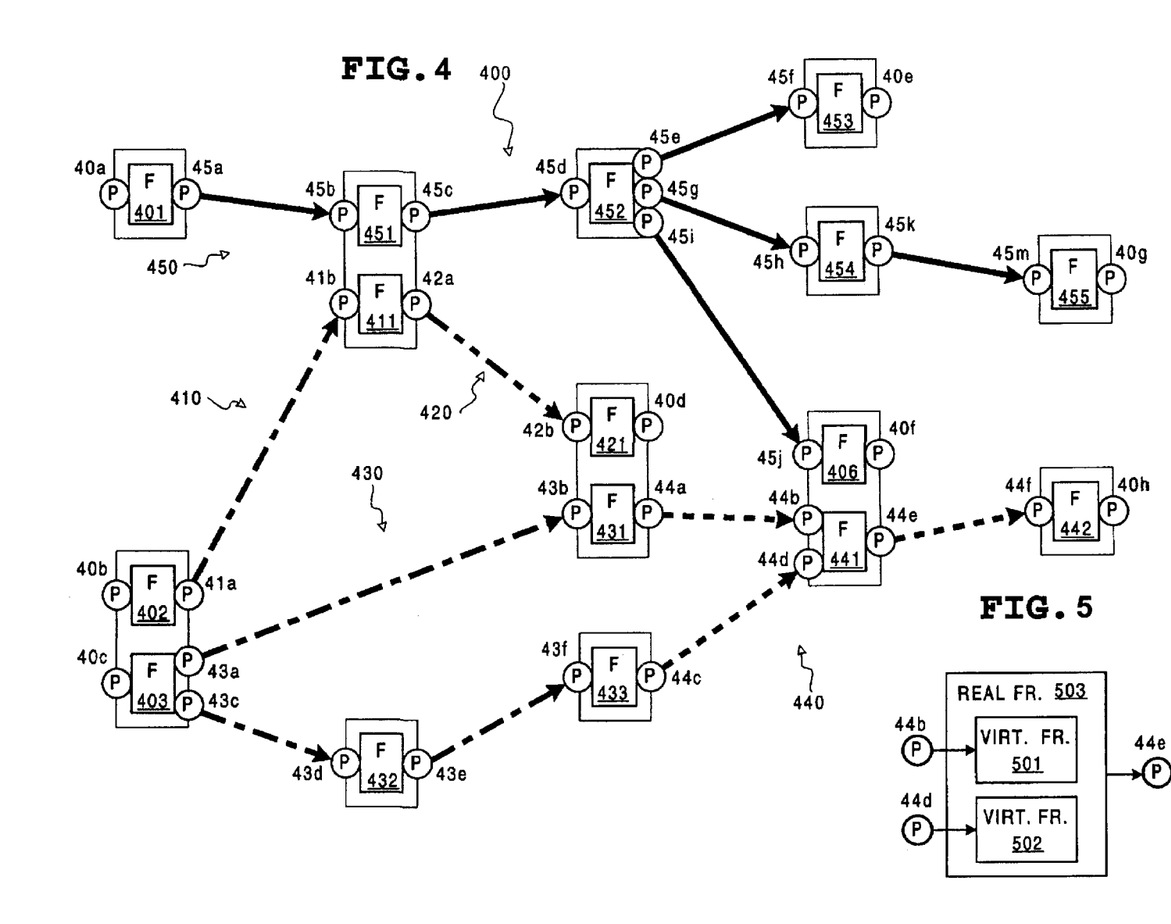
FIG. 4 diagrams a representative streaming-data graph for the components of FIG. 3.
FIG. 5 illustrates a special data-frame type used in FIG. 4.

FIG. 4 symbolizes a graph 400 for transmitting one or more streams of data through selected ones of the components 300 in order to achieve one or more overall transformations of the data. Individual physical components are shown as light rectangles surrounding heavier function blocks. In the conventions of the WDM-CSA protocol, functions communicate data to each other by means of logical pins, labeled P. Pins are usually dedicated either to input or output, but can also be bidirectional. Heavy arrows signify the transfer of data among different functions, almost always involving storing data frames in one of the available buffer memories between successive function blocks.

In the specific example graph 400, the frames of one data stream enters at pin 40*b* and exit at pin 40*d*. Frames of a second, independent stream enters at pin 40*c* and exits at 40*h*, after separating into two streams and then recombining at a later point. A third stream of frames enters at 40*a* and exits in three different forms at pins 40*e*, 40*f*, and 40*g*. Graph 400 processes all of these streams concurrently—simultaneously from the viewpoint of the end user of the data, but almost always at least partially in an interleaved serial manner in the hardware and software of system 100. FIG. 4 numbers the pins from 40*a* through 45*m*. The heavy arrows representing data paths will be referred to in accordance with the pins at their ends; for example, path 43*cd* runs from pin 43*c* to pin 43*d*. The logical function blocks have numbers from 401 through 455.

FIG. 5 illustrates one possible way of merging two data frames into a single output, as required in function 441, FIG. 4. A frame 501 arriving at pin 44*b* is interleaved with a frame 502 arriving at input 44*d*. The resulting frame 503 is output from pin 44*e*. The only real data frame is 503; frames 501 and 502 are virtual frames. They do not exist independently of frame 503, although they define the final layout of the output frame.

In FIG. 4, many of the operations in processing data through a graph 400 involve storing frames of the data between functional transformations. Such storage is overhead for the useful work of manipulating the data in the frames. Minimizing the number of data copies is very important in the processing of streaming-data. FIG. 4 illustrates the concept of data pipes for reducing the number of times that data needs to be copied in flowing through graph 400. A data pipe represents a set of pins that share a common memory allocator 320. Each pipe has a common maximum frame size, as explained below.

The entire graph is represented as a set of interconnected data pipes. Pipe 410 has a single leg 41*ab*, from pin 41*a* to pin 41*b*. Pipe 420 also has but a single leg 42*ab*, from 42*a* to 42*b*. Pipe 430 has three legs. Leg 43*ab* takes data from one output pin 43*a* of filter 403 to the input pin 43*b* of filter 431. Leg 43*cd* proceeds from the other output of filter 403 to the input pin of filter 432, and the remaining leg 43*ef* carries data from the output of filter 432 to the input of filter 433. Although the data in each leg can be different, all of the data in pipe 430 has the same maximum frame size, because each leg of the pipe uses the same memory allocator. Pipe 440 combines data from two legs 44*ab* and 44*cd* into a common stream in leg 44*ef*. A large pipe 450 has six legs, carrying data from pin 40*a* to three separate outputs 40*e*–40*g*, all with the same maximum frame size throughout. The significance of the pipe is that data is merely read and written in-place into the memory controlled by one allocator, eliminating the copying of data and conversion to different frames.

Figure 6:
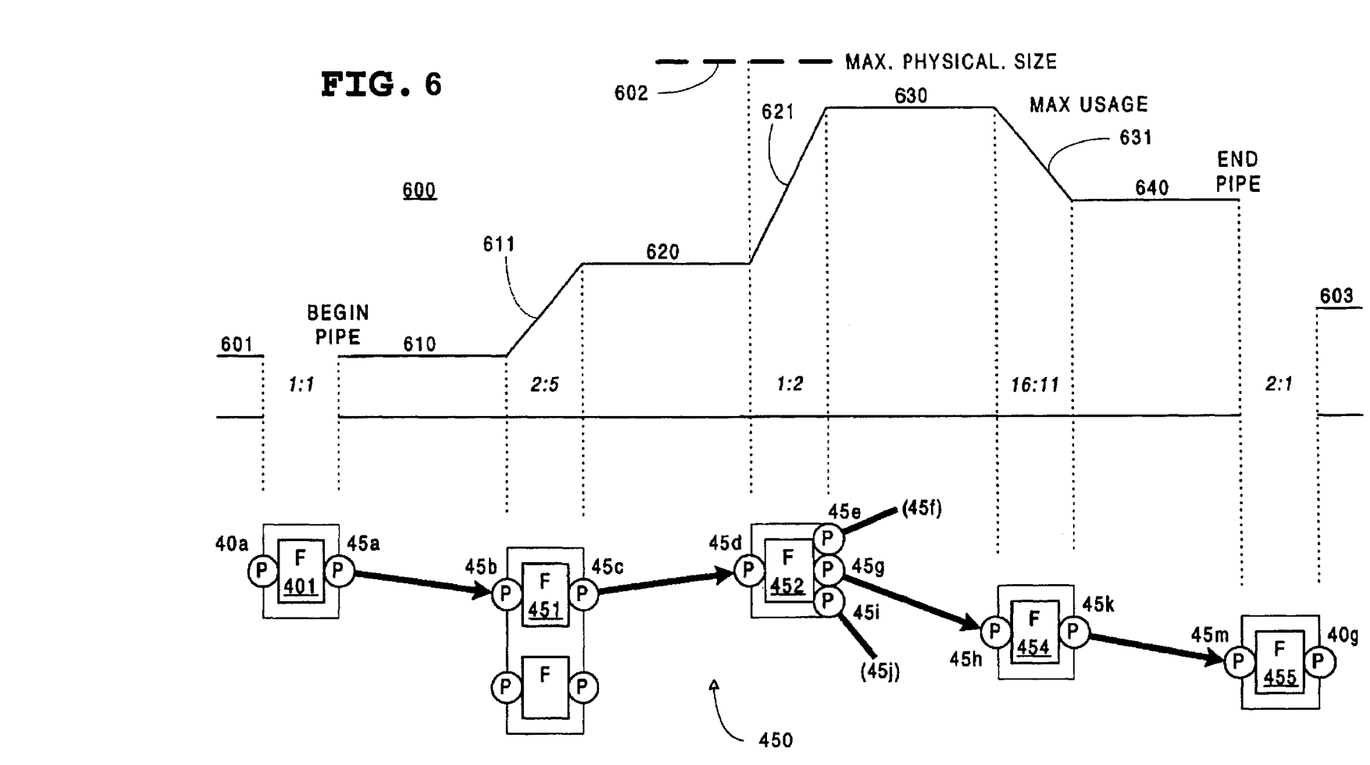
FIG. 6 illustrates memory allocation and usage for a portion of the graph of FIG. 4.

FIG. 6 illustrates memory allocation in a pipe. The lower part reproduces a portion of pipe 450, FIG. 4. The upper portion 600 shows memory usage along the legs of pipe 450. The height of line 601 symbolizes an amount of data in a frame entering pin 40*a*, and thus the amount of memory required to store it. Filter 401 does not change the data size, so that the data leaving pin 45*a* is the same size as the input data. The heights of lines 610 and 601 are equal. However, although the frame size of the input data could be as little as the height of line 601, the data leaving pin 45a requires a much larger frame size, because it must accommodate the maximum data size in the pipe. Filter 451 expands the data frame by a 2:5 ratio, symbolized at line segment 611. Line 620 indicates this larger data size. Filter 452 again expands the data, by a 1:2 factor at line 621. Filter 454 next reduces the data size on line 630 by 16:11, as shown by line 631. The end of the pipe, line 640, thus carries somewhat less data. The amount of data at the end of a pipe may not be the same as the amount at its beginning.

The minimum acceptable frame size for this pipe is determined by the maximum memory usage, which occurs at line 630 in this example. Dashed line 602 indicates a physical size limit for the memory managed by the allocator for this pipe. Function unit 455 again reduces data size as shown at line 603. A pipe connected to pin 40g could therefore use a smaller frame size. The two legs 45ef and 45ij, not fully shown in FIG. 6, must of course abide the same maximum frame size as the other legs of pipe 450.

Figure 7:
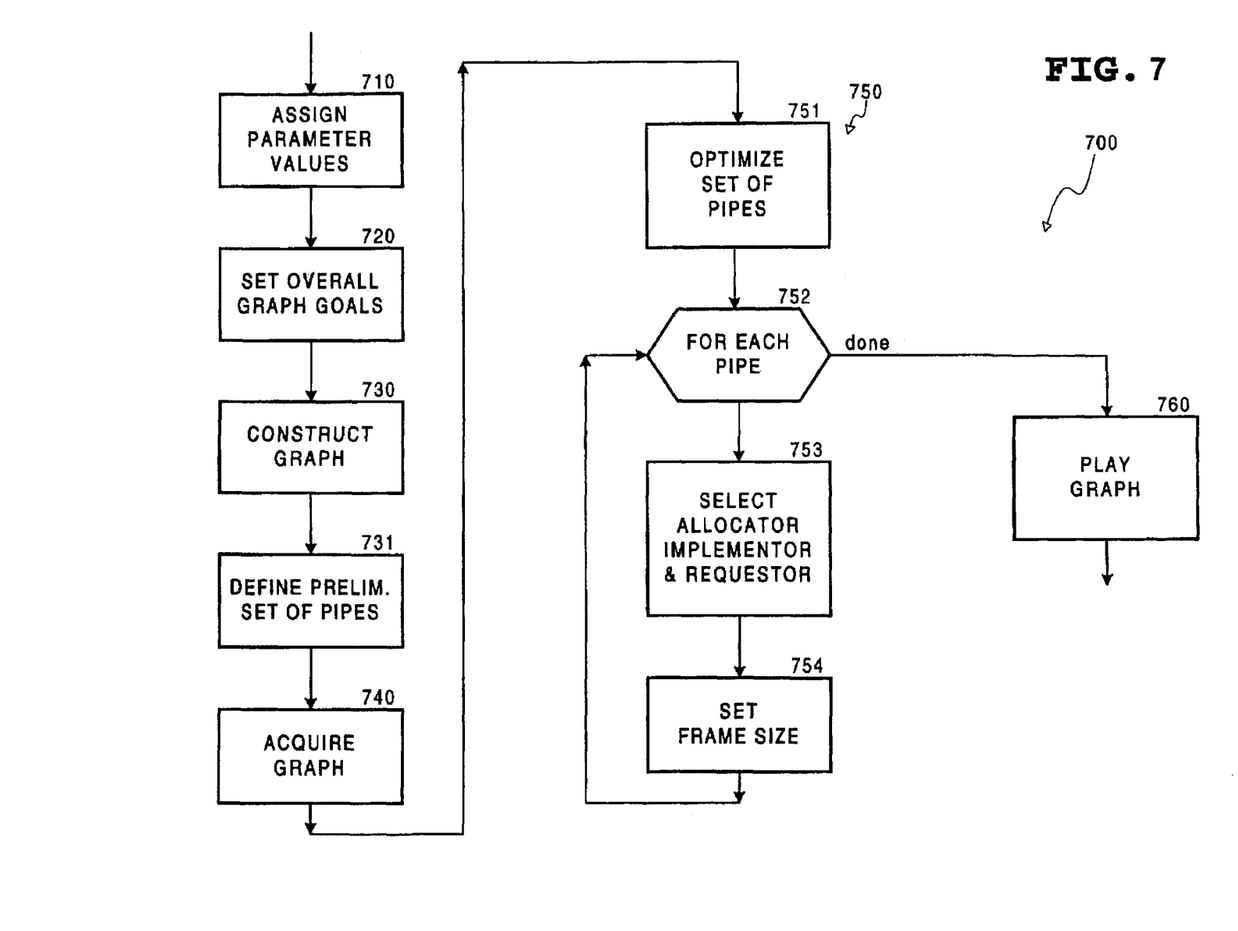
FIG. 7 is a flowchart of a method for allocating memory according to the invention.

FIG. 7 is a flow chart of a method 700 according to the present invention for improving overall data flow through a connection graph such as 400, FIG. 4.

Block 710 assigns values of certain parameters to each function unit 401–455. A number of properties are significant in determining the data flow capacity of a functional module. A representative list includes:

| | |
|---|---|
| Medium | Different buses available to the function have different speeds and bandwidths. |
| Interface | Different protocols have different efficiencies for the particular type of data processed by the function. |
| Data Format | Compression methods allow more data to be moved. |
| Memory Type | Different types of memory fit the data better or worse than other types. |
| Frame Size Range | Particular hardware devices and software modules can require that the frame size be within a certain range of allowable sizes. These requirements can result from the nature of the data, physical memory limitations, and other sources. |
| Data Copying | In-place algorithms might be available to reduce the number of data copies, and to reduce memory usage. |
| Internal Compression | A function unit might be able to perform in-place compression and decompression of data, reducing the number of data copies and memory usage. |
| Frame Format | Different frame layouts might correspond more closely to that required by the function block that consumes the data. |

The value or weight assigned to each parameter for a given pin of a function unit is an arbitrary number representing the importance or weight of that parameter relative to other parameters for the same pin. In one embodiment, the parameter weight can be any integer between 0 and 100, where the most important parameter's weight is equal 100. For example, the speed of its input bus is very important to high-definition composite television data (Medium Weight= 90), while the type of memory used to store it might not be especially critical (Memory-Type Weight=2) for a digital filtering block. It is possible that different pins of the same function have different parameter values, because different pins of the same function can be related to different data streams or different transports. Also, the designer of the filter's function does not know the context (i.e., the entire graph) in which the function will be used. So the function designer can only assign the weights of the parameters as they apply internally to the function. The relative importance of a pin's data-flow properties from the graph-wide data-flow viewpoint can be defined by the graph client through the pin weights.

Thus, each pin, or a larger unit such as a filter 331, has a set of numbers expressing the relative importance of different parameters among each other to the efficient operation of that individual function. The function designer sets the parameter values. Alternatively, the WDM-CSA system can assign default values, possibly with suggestions from the filter designer. The values are stored in any convenient place in the hardware or software.

In block 720, the user, application program, or other client software sets overall goals for the graph as a whole. Different circumstances can have different goals and constraints. For example, high-definition multimedia might desire to maximize raw speed from input to output of the graph. On the other hand, minimizing total memory usage might be more important to a graph running in a low-end computer. A combination of constraints is also feasible: propagating at least 10 kbits/sec of data through the graph while using less than 20 kBytes of memory, for example.

Block 730 constructs the desired graph. In the example of FIG. 4, graph 400 has been constructed as a list of ordered pin connections from three data inputs 40a–40c to five output pins 40d–40h, along the paths shown in heavy lines. An application program, media player, or other client defines the graph—or at least places certain constraints on possible graphs—according to the type of presentation to be carried out and the resources of the particular computer that carries out the presentation. Different applications will construct different graphs. The same application might construct different graphs at different times. A given computer might implement multiple graphs concurrently. That is, the paths from input 40a to outputs 40e–40g could constitute one graph, and the remaining paths could be a separate graph, independent of the first.

Block 731 builds a preliminary set of pipes during the graph building process 730. Pipes are dynamic software objects defining the following major data-flow items: physical memory type, physical bus types, frame size range, compression/expansion ratio between pipe termination points, number of frames, frame alignment, and pin weights, as well as some additional cached information to reduce the time to complete the data-flow negotiation for each pin's connection/disconnection operation. While the graph is being built, the data pipes are not finalized, and the frame size is expressed as a frame-size range for each pipe.

When a particular streaming-data application 112 sets up before starting to play the graph, it acquires a graph at block 740.

Once the graph transition is made into an "Acquired" state, the set of pipes is finalized in blocks 750. The objective is to find the set of data-flow parameters that allows the propagation of streaming data throughout the graph and that yields the highest sum of all the parameter values within the constraints of the defined graph-wide goal. These blocks 750 are explained for one preferred embodiment.

Block 751 measures the performance of multiple alternatives against the goals of block 720 according to the parameter values of block 710. For each connection between an output pin of an upstream filter and an input pin of a downstream filter that requires passing the data, there must be an allocator that satisfies both pins' data-flow properties: the set of mediums, interfaces, memories, data formats, frame size ranges, in-place transform capabilities, in-place compression/expansion capabilities, special frame formats, etc., that are supported by each connecting pin. Almost always, there are multiple combinations of individual filters' data-flow parameters that allow all the filters to get connected in a graph, while satisfying the defined constraints of the graph's client. In one embodiment, block 751 finds one set of data-flow parameters for each filter's connection in a graph that satisfy the defined constraints and also optimize the following graph-wide function:

> Sum1[UpstreamPinDataFlowWeight*Sum2
> (UpstreamPinDataFlowParameterWeight)+
> DownstreamPinDataFlowWeight*Sum3
> (DownstreamPinDataFlowParameterWeight)]

where Sum1 is computed for each filter's connection in a graph between all pairs of connected UpstreamPin pins and DownstreamPin pins, Sum2 is computed for all the UpstreamPin pins' selected data-flow parameters, and Sum3 is computed for all the DownstreamPin pins selected data-flow parameters.

Block 752 cycles through the pipes. For each one, block 753 assigns one of the memory managers 320 as an allocator-implementor to do the physical memory allocation, and assigns one of the memory managers 320 as an allocator-requestor to do the logical memory management. The memory managers 320, both allocator-implementors and allocator-requestors, can be implemented and exposed by any filter. Alternatively, they can be realized by the system's general-purpose streaming components, such as WDM-CSA. Block 754 specifies a frame size for the data flowing through that pipe within the allowable frame-size range. As discussed above, the frame size must be large enough to accommodate the maximum amount of data in the entire pipe; on the other hand, physical memory size sets an upper limit, and efficiency dictates that memory not be wasted by overlarge frame capacities. The frame sizes of adjacent pipes also need to be considered, along with the compression/expansion ratios at the pipe's termination points 45a and 45m, FIG. 6, to satisfy the entire graph's data flow.

A user or other command to process a particular stream of data causes block 760 to play the graph—that is, to process a data stream through the graph.

Conclusion

The present invention improves the flow of streaming data through a graph. Although preferred ways of achieving this goal have been described above, alternatives within the scope of the appended claims will occur to those skilled in the art. Although the above description has presented the hardware, software, and operations of the invention in a particular sequence, this does not imply any specific interconnection or time order of these entities.

We claim as our invention:

1. A method for transporting streaming data through multiple modules in a digital computer, comprising:

setting values for a set of performance parameters for each of the modules, the set of performance parameters comprising a frame-size range parameter, the values indicating the weights of the parameters for respective ones of the modules;

constructing a graph as a sequence of the modules for accepting and processing frames of streaming data to achieve desired output data;

selecting one or more performance goals for the graph as a whole;

dividing the graph into a set of pipes in response to the parameter values of the individual modules and the goals of the graph as a whole, wherein each pipe comprises at least one module, wherein each pipe has a maximum frame size, the maximum frame size based, at least in part, on the frame-size range parameters of the modules within the pipe, wherein non-final modules in the pipe, if any, are capable of processing data in-place, and wherein a final module in the pipe is either a last module in the graph or is incapable of processing data in-place; and for each pipe, providing a common memory area accessible to the modules within the pipe for storing streaming data.

2. The method of claim 1 further comprising, for each of the pipes, selecting one module in that pipe for allocating the frames for the streaming data.

3. The method of claim 1 further comprising:
   associating resources of the computer to the modules.

4. The method of claim 1 wherein the performance parameters are selected from the group consisting of: module data-flow function indications, bus medium and interface protocol, frame-size range, frame format, memory type, data copying, and data compression.

5. The method of claim 1 wherein a value of a performance parameter for a module indicates an importance of that performance parameter to an operation of that module.

6. The method of claim 1 wherein each module comprises a set of pins.

7. The method of claim 2 further comprising acquiring the graph for processing the streaming data.

8. The method of claim 6 wherein constructing a graph comprises connecting pins of modules in the graph.

9. The method of claim 7 further comprising playing the graph so as to transport the streaming data through the modules of the graph.

10. The method of claim 8 wherein connecting pins establishes a flow of frames of streaming data through the graph.

11. A computer-readable medium containing instructions for performing a method for transporting streaming data through multiple modules in a digital computer, the method comprising:

setting values for a set of performance parameters for each of the modules, the set of performance parameters comprising a frame-size range parameter, the values indicating the weights of the parameters for respective ones of the modules;

constructing a graph as a sequence of the modules for accepting and processing frames of streaming data to achieve desired output data;

selecting one or more performance goals for the graph as a whole;

dividing the graph into a set of pipes in response to the parameter values of the individual modules and the goals of the graph as a whole, wherein each pipe comprises at least one module, wherein each pipe has a maximum frame size, the maximum frame size based, at least in part, on the frame-size range parameters of the modules within the pipe, wherein non-final modules in the pipe, if any, are capable of processing data in-place, and wherein a final module in the pipe is either a last module in the graph or is incapable of processing data in-place; and for each pipe, providing a common memory area accessible to the modules within the pipe for storing streaming data.

12. A method for transporting streaming data through multiple modules in a digital computer, comprising:

constructing a graph as a connected sequence of the modules for accepting and processing frames of streaming data to achieve desired output data, wherein a frame-size parameter is associated with each module;

dividing the graph into a set of pipes, wherein each pipe comprises at least one module, wherein each pipe has a maximum frame size, the maximum frame size based, at least in part, on the frame-size range parameters of the modules within the pipe, wherein non-final modules in the pipe, if any, are capable of processing data in-place, wherein a final module in the pipe is either a last module in the graph or is incapable of processing data in-place, and wherein at least one of the pipes includes multiple ones of the connected modules in the graph;

for each of the pipes, selecting one module in that pipe for allocating the frames for the streaming data; and for each of the pipes, providing a common memory area accessible to the modules within the pipe for storing streaming data.

13. The method of claim 12 where frames are allocated from a memory.

14. The method of claim 12 further comprising setting a frame size for each of the allocated frames.

15. A computer-readable medium containing instructions for performing a method for transporting streaming data through multiple modules in a digital computer, the method comprising:

constructing a graph as a connected sequence of the modules for accepting and processing frames of streaming data to achieve desired output data, wherein a frame-size parameter is associated with each module;

dividing the graph into a set of pipes, wherein each pipe comprises at least one module, wherein each pipe has a maximum frame size, the maximum frame size based, at least in part, on the frame-size range parameters of the modules within the pipe, wherein non-final modules in the pipe, if any, are capable of processing data in-place, wherein a final module in the pipe is either a last module in the graph or is incapable of processing data in-place, and wherein at least one of the pipes includes multiple ones of the connected modules in the graph;

for each of the pipes, selecting one module in that pipe for allocating the frames for the streaming data; and for each of the pipes, providing a common memory area accessible to the modules within the pipe for storing streaming data.

16. A computer system for transporting streaming data, comprising:

a plurality of modules each having a set of performance parameter values, the set of performance parameters comprising a frame-size range parameter, the values indicating relative weights of the parameters for respective ones of the modules;

a set of performance goals associated with the graph as a whole; and a flow manager for constructing a graph as a sequence of the modules for accepting and processing frames of streaming data to achieve desired output data in response to both the parameter values of the individual modules in the graph and the performance goals of the overall graph, for dividing the graph into a plurality of pipes, wherein each pipe comprises at least one module, wherein each pipe has a maximum frame size, the maximum frame size based, at least in part, on the frame-size range parameters of the modules within the pipe, wherein non-final modules in the pipe, if any, are capable of processing data in-place, and wherein a final module in the pipe is either a last module in the graph or is incapable of processing data in-place, and for providing, for each pipe, a common memory area accessible to the modules within the pipe for storing streaming data.

17. The system of claim 16 where the performance parameters indicate data-flow functions of the modules.

18. The system of claim 16 where the parameters include bus medium and interface protocol.

19. The system of claim 16 further including a plurality of memory managers for allocating data frames.

20. The system of claim 17 where each of the parameter values for a given module indicates an importance of its associated parameter to the operation of that module.

21. The system of claim 18 where the parameters further include frame format.

22. The system of claim 18 where the parameters further include memory type.

23. The system of claim 19 where the flow manager further assigns a single one of the memory managers to each pipe.

24. The system of claim 23 where the memory manager for each pipe allocates frames for transporting the streaming data through all modules of that pipe.

* * * * *